(12) United States Patent
Poloniewicz et al.

(10) Patent No.: US 7,395,970 B2
(45) Date of Patent: Jul. 8, 2008

(54) ZERO-FOOTPRINT CAMERA-BASED POINT-OF-SALE BAR CODE PRESENTATION SCANNING SYSTEM

(75) Inventors: Paul Poloniewicz, East Setauket, NY (US); Mehul Patel, Fort Salonga, NY (US); Sundeep Kumar, Plainsboro, NJ (US); Joseph Cai, Holbrook, NY (US); Duanfeng He, Farmingville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 35 days.

(21) Appl. No.: 10/837,911

(22) Filed: May 3, 2004

(65) Prior Publication Data

US 2005/0098633 A1 May 12, 2005

(51) Int. Cl.
*G06K 7/10* (2006.01)
(52) U.S. Cl. .............................. 235/462.2; 235/462.42
(58) Field of Classification Search ............ 235/462.01, 235/462.07, 462.11, 462.14, 462.2–462.25, 235/462.32, 462.41, 462.42, 462.45, 383, 235/454
See application file for complete search history.

(56) References Cited

U.S. PATENT DOCUMENTS

| | | | | | |
|---|---|---|---|---|---|
| 3,774,014 | A | * | 11/1973 | Berler | 235/462.11 |
| 4,084,742 | A | * | 4/1978 | Silverman | 235/383 |
| 4,929,819 | A | | 5/1990 | Collins, Jr. | 235/383 |
| 5,132,525 | A | * | 7/1992 | Swartz et al. | 235/462.21 |
| 5,393,965 | A | * | 2/1995 | Bravman et al. | 235/383 |
| 5,446,272 | A | * | 8/1995 | Barkan | 235/454 |
| 5,491,328 | A | * | 2/1996 | Rando | 235/462.14 |
| 5,557,093 | A | * | 9/1996 | Knowles et al. | 235/462.32 |
| 5,642,160 | A | * | 6/1997 | Bennett | 348/156 |
| 5,747,784 | A | | 5/1998 | Walter et al. | 235/383 |
| 5,819,092 | A | * | 10/1998 | Ferguson et al. | 717/113 |
| 5,821,518 | A | * | 10/1998 | Sussmeier et al. | 235/462.01 |
| 5,866,887 | A | * | 2/1999 | Hashimoto et al. | 235/98 R |
| 5,878,395 | A | * | 3/1999 | Bennett | 704/275 |
| 6,056,087 | A | | 5/2000 | Addy et al. | 186/61 |
| 6,123,261 | A | * | 9/2000 | Roustaei | 235/462.01 |
| 6,179,206 | B1 | * | 1/2001 | Matsumori | 235/383 |
| 6,236,736 | B1 | | 5/2001 | Crabtree et al. | 382/102 |
| 6,330,973 | B1 | * | 12/2001 | Bridgelall et al. | 235/462.45 |
| 6,336,587 | B1 | * | 1/2002 | He et al. | 235/462.45 |
| 6,527,179 | B1 | * | 3/2003 | Itoh et al. | 235/462.01 |

* cited by examiner

*Primary Examiner*—Thien M. Le
*Assistant Examiner*—Kumiko C. Koyama
(74) *Attorney, Agent, or Firm*—Kirschstein, et al.

(57) ABSTRACT

A bar code scanning system and method for reading and processing bar code symbology uses a scanning station installed above the check-out stand and a receiving station at some distance away from the scanning station. The scanning station projects light onto a surface of the check-out stand. The projected light can have a well defined border indicating where a user should place items to be scanned. Alternatively, a pattern coincident with the projected light can be projected onto the surface and which includes a target indicating where items should be placed for scanning. Light reflected by items in the target region is processed to decode optical symbology on the item and produce a signal that is representative of said sensed symbology. Information about the scanned item can be processed and displayed by the receiving station for use in, e.g., a point-of-sale transaction. The system can also be configured to capture images of a user's payment card for use in payment processing and to store images of at least selected scanned items for use in subsequent processes.

40 Claims, 5 Drawing Sheets

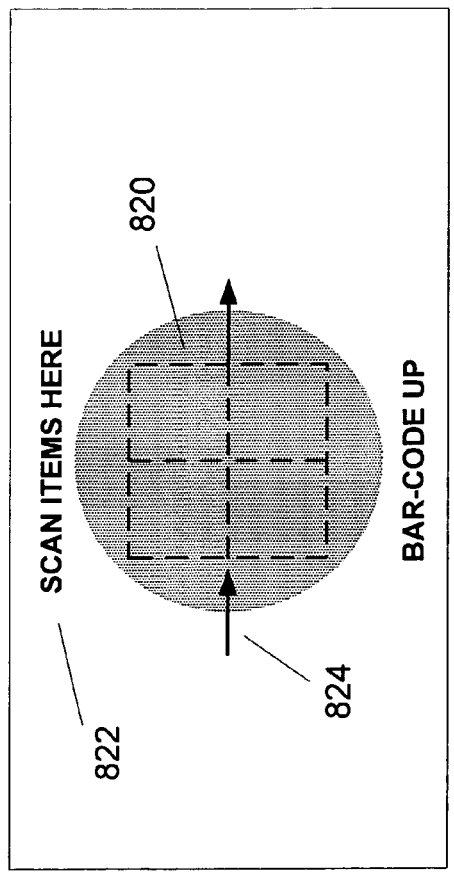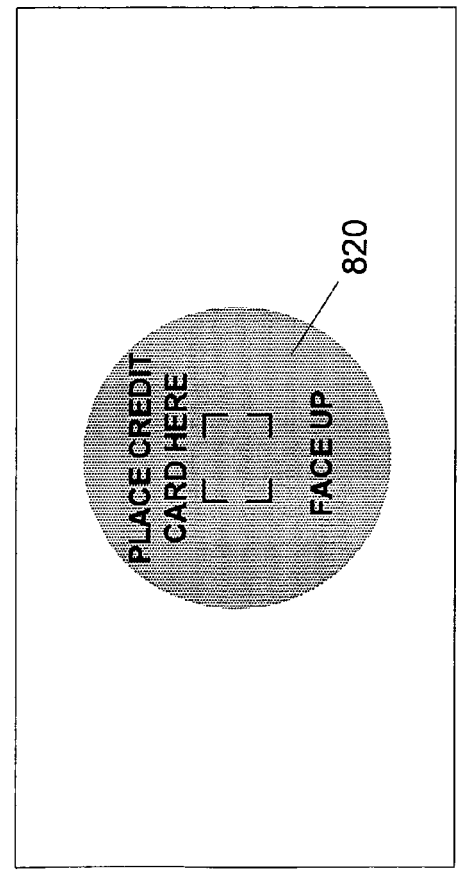

ZERO-FOOTPRINT CAMERA-BASED POINT-OF-SALE BAR CODE PRESENTATION SCANNING SYSTEM

FIELD OF THE INVENTION

The present invention relates to bar code scanning and imaging systems that are utilized at point-of-sale in stores, supermarkets and in other businesses or applications where the bar codes on items are regularly scanned by bar code scanning devices and the captured information is transferred to a host computer system, which then processes, registers and stores information transferred to it.

BACKGROUND OF THE INVENTION

With the advent of the electronic age, bar codes and bar code scanning systems became the primary means for identifying, tracking, cataloging and otherwise managing objects of various sizes in a variety of different industries and applications. Grocery, food processing and retail industries, assembly lines and warehouses, among many others, utilize bar codes to store information, either directly on the items, or on printed labels that are attached or associated with the items.

Bar codes typically consist of a series of lines and spaces of various widths, or other types of symbols comprised of a series of contrasting markings. These contrasting markings usually represent strings of binary ones and zeroes. These patterns are read by a number of different bar code readers, hand-held wands and laser scanning systems that have been developed to capture and decode the symbol pattern to a numeric or alphanumeric representation for inventory, production tracking, check-out or sales purposes. One common example of a bar code is the Universal Product Code (UPC).

Most point-of-sale systems that utilize bar codes, such as retail stores and supermarkets, or factories, warehouses and other businesses utilize stationary laser-based bar code readers or scanners. The scanners are generally installed in or on the check-out counter and thus take up some otherwise useful physical space at the counter. These types of systems also are often installed, at least in part, within the physical housing. For example, in-counter slot scanners typically have glass exit windows in the same horizontal plane as the counter. One of the drawbacks of utilizing these scanners is that the debris and dirt that accumulate on the horizontal plane can scratch, damage, or otherwise obscure the glass surface, degrading performance of the scanner and possibly causing malfunctions. Moreover, the addition of such a scanning system to a check-out station requires specialized and often expensive installation to provide custom-made surfaces, cut-outs, etc. at the counter where scanning is performed. Even if the check-out station is constructed initially with cut-outs and other features designed to accept a scanning system, such features can severely limit the use of the check-out counter for non-scanning purposes.

Another shortcoming of the bar code readers that are utilized with existing point-of-sale systems is that they require the operator to visually locate the bar code on the item that is being scanned and to position it in the scanner's field of view. For example, when the scanner is installed on the opposite side of a check-out counter, the operator must rotate the surface containing the bar code away from himself and toward the field of view of the scanner. Bi-optic or multi-planer scanning systems, which typically have two (or more) active "sides" (i.e. able to scan a bar code on both the bottom surface and from the side) alleviate the need to rotate the object toward the scanner. They are very expensive, however, and overly complex in their installation and maintenance.

In addition to laser-based scanning, some camera-based scanning systems are known. These systems use conveyer belts to move and scan items with bar codes, such as inventory or mail, past the scanning system at high rates of speed. These scanning systems rely upon the automated conveyor and other automated systems to accurately place items to be scanned within the proper field of view of the scanning camera system. Such large-scale conveyor scanning systems are too expensive and impractical for use in a typical point-of-sale environment. Moreover, automated item placement by a conveyor and other systems is generally not available in a point-of-sale. Instead, establishments rely upon typically untrained customers to manually scan items. Thus, additional mechanisms are necessary to aid users in correctly placing items during the scanning process.

Some known point-of-sale self-checkout scanning systems for use by customers in a retail environment include a camera. Such a system is disclosed, for example, in U.S. Pat. Nos. 5,965,861 and 6,236,736. However, such systems do not use the camera to detect and process the bar-code on the items. Instead, a conventional in-counter laser-based scanning system is provided which has the drawbacks discussed above. The camera system is used to provide additional security, e.g., by tracking the motions of a customer's hand to detect scanning-type motions or to detect when items have been placed in a bag before it has been scanned.

SUMMARY OF THE INVENTION

One objective of the present invention is to avoid the drawbacks and shortcomings of the existing scanning systems utilized at the point-of-sale in retail stores and supermarkets, and in factories, warehouses or other businesses or applications where items to be scanned are manually positioned relative to the scanning apparatus.

Another objective of the present invention is to provide a bar scanning system that is relatively inexpensive, easy to install and simple to operate and maintain.

It is yet another objective of the present invention to provide a bar scanning system that does not require the operator to turn the bar code away from the operator's line of sight in order to get it into the field of view of the scanner. In other words, the operator can scan items while the code is in full sight, thereby removing the "blind" operation.

A further objective of the present invention is to provide a bar scanning system for which the scanning component (scanning station) does not take up useful physical space on or inside of the check-out counter.

Another objective of the present invention is to provide a bar scanning system that is easily adapted to for use with the different types of scanners that are known in the art today, such as CCD-type scanners, CMOS-type cameras, etc., as well as new or improved scanners that may be developed in the future.

Yet a further objective of the present invention is to provide a scanning system which utilizes the scanning system to receive credit or debit information from a customer's payment card without requiring the use of a magnetic card reader.

The bar scanning system of the present invention accomplishes the abovementioned and other objectives by providing a novel bar code scanning system for reading and processing bar code symbology that has at least two separate stations, namely, a scanning station that has a scanner installed above the check-out stand, as for example in the ceiling or on a bracket above the stand, and a receiving station at some distance away from the scanning station. The scanning station of this system consists of a light emitting diode (LED), laser diode, an incandescent lamp or any other type of illumination source that projects light onto the symbology to be scanned, an optical assembly that focuses light reflected from the symbology, an imager that senses and captures the reflected image, a decoder that converts that reflected image of the symbology into a signal that is representative of said sensed symbology, and a wireless transmitter. In one embodiment, the light source may be a bright incandescent lamp, focused by means known in the art to provide a sharp, bright scanning spot for scanning bar codes or other types of optical indicia.

When scanned symbology is captured at the scanning station, it is then decoded and transmitted to the wireless receiver of the receiving station, which then stores and processes that signal. If used at point-of-sale in a store or supermarket, the receiving station may be a check-out counter, with an input device (for example, a keyboard), a display, a cash register, and a receipt printer. Alternatively, the receiving station may be separate from the check-out counter and include a transmitter that would relay signals received from the scanning station to the check-out counter.

In a particular embodiment, the scanning station comprises a video camera which captures images of objects as they are passed through the illumination spot. The images are processed to locate the bar code symbology and extract the relevant item data. The video scanning system can also be used to capture an image of a customer's credit or debit card for processing to extract the card number and other printed data and so avoid the necessity of providing a separate magnetic card scanner.

The camera images can be stored in a database to maintain a visual record of scanned items. The images can be associated with e.g., a customer's receipt or credit-card number, and recalled in the event there is a dispute about a purchased item. The stored image data can also be used for various other security and non-security purposes.

Preferably, the light source which illuminates the scanning area is configured to project a light spot with a well defined boundary onto a surface of the checkout stand. The light spot boundary indicates to a user where an item to be scanned should be placed.

In a further embodiment, a second light source is provided which projects a target, such as a box or cross-hairs, at least partially co-incident with the light spot and onto a surface of the checkout stand. The target defines an area where an item should be placed in order for it to be properly scanned. Different target patterns can be provided for use during different phases of checkout. The target can also include instructional designs or text. Less-specific target patterns can also be provided, including logos and advertisements, for use during non-scanning periods.

These and other objectives, characteristic and advantages of the present invention will be disclosed in more detail with reference to the attached drawings.

BRIEF DESCRIPTION OF THE DRAWINGS

FIGS. 4A-4C show a top view of a checkout counter with a various projected patterns coincident with the scanning illumination spot.

DETAILED DESCRIPTION OF THE INVENTION

Figure 1:
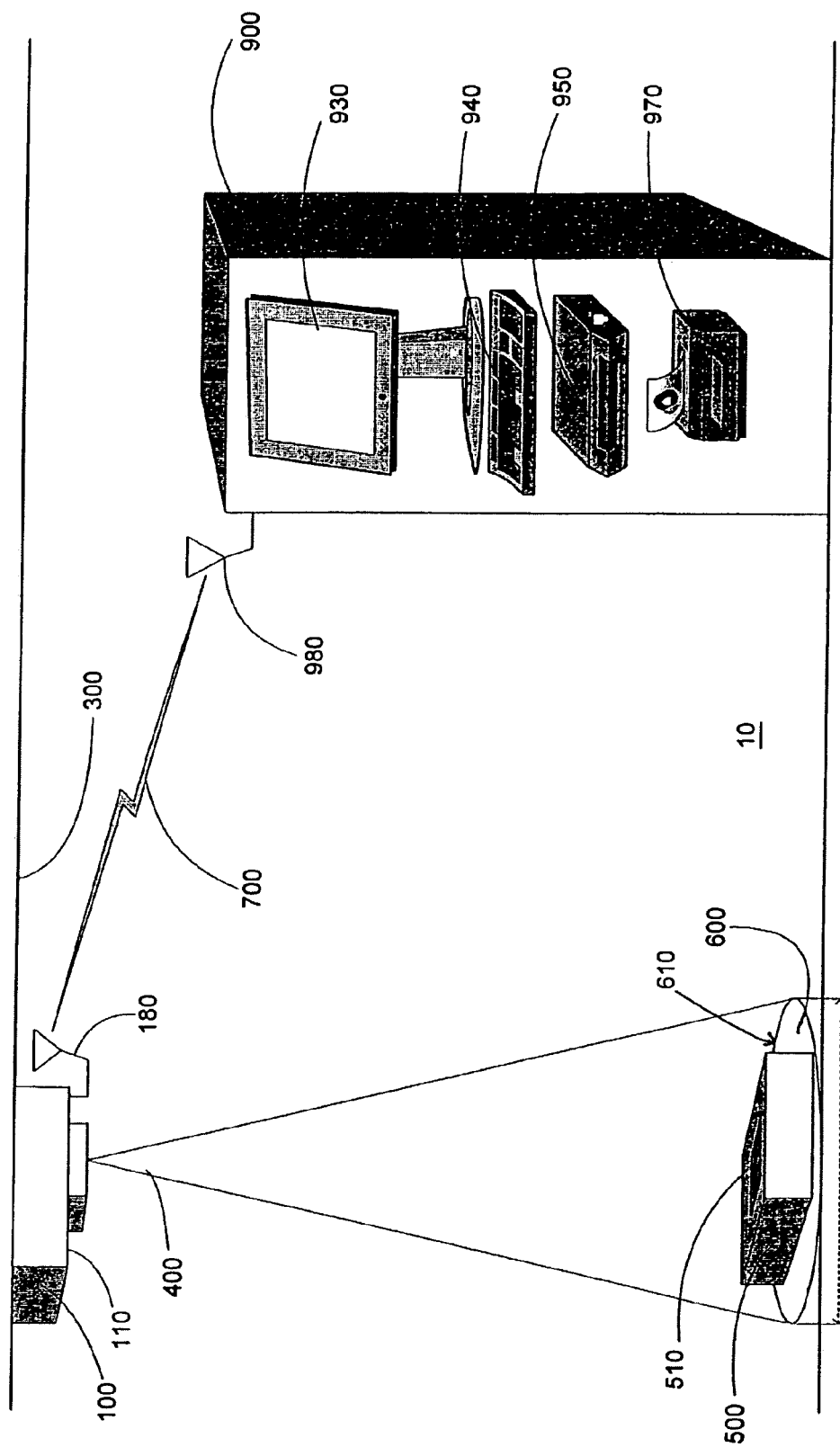
FIG. 1 is an overall schematic diagram of the scanning system according to the present invention.
Figure 2B:
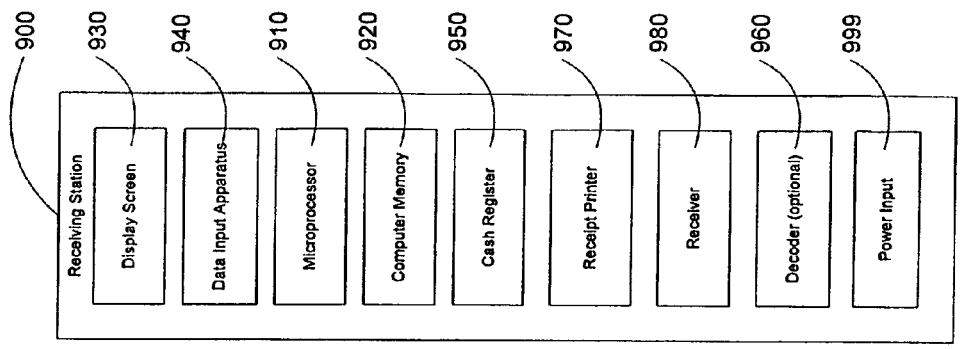
FIGS. 2A and 2B are schematic box diagrams of the scanning station and receiving stations, respectively, in accordance with the present invention.
Figure 2A:
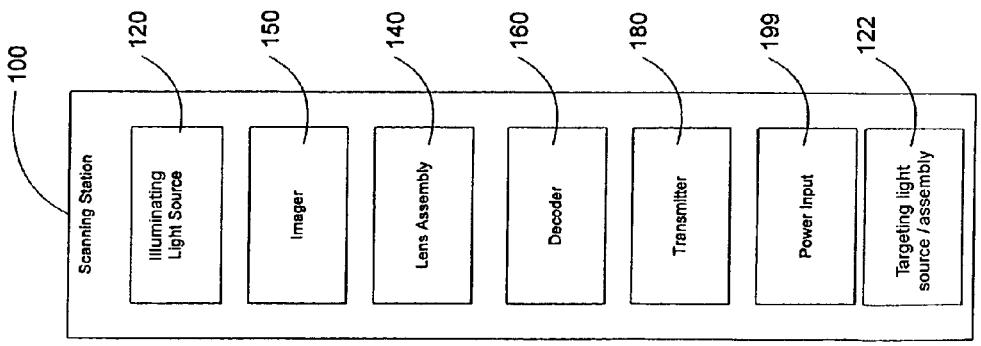

A schematic diagram of one embodiment of the bar scanning system according to the present invention is shown in FIGS. 1, 2A and 2B. The bar code scanning system 10 of the present invention consists of two basic components: a scanning station 100 and a receiving station 900. The scanning station 100 can be ceiling mounted with such that the station is on or at least partially within the ceiling 300 of the room where it is intended to operate. Preferably, a durable outer shell 10 is provided to house at least some of the components of the scanning station, and particularly portions of the scanning station which are visible in the room where it is to operate. When scanning station 100 is mounted inside the ceiling 300, some or all of the outer shell 110 can be omitted.

The scanning station 100 contains a light source 120 for projecting light beams 400 onto the bar code symbology 510 of the object 500 that is being scanned. The light source 120 may consist of one or more light emitting diodes (LEDs), a laser diode, or other types of illumination sources, such as, for example, a bright incandescent lamp with a focusing assembly that produces a spot of bright light, which may be as small as a few inches in diameter, to which the bar code symbology 510 on the item 500 is brought by the operator for scanning operation. The diameter 650 of the light spot projected by the light source 120 may be as small as a few inches, covering only the bar code symbology 510, or large enough to cover the whole item 500, as shown in FIG. 1.

Figure 3:
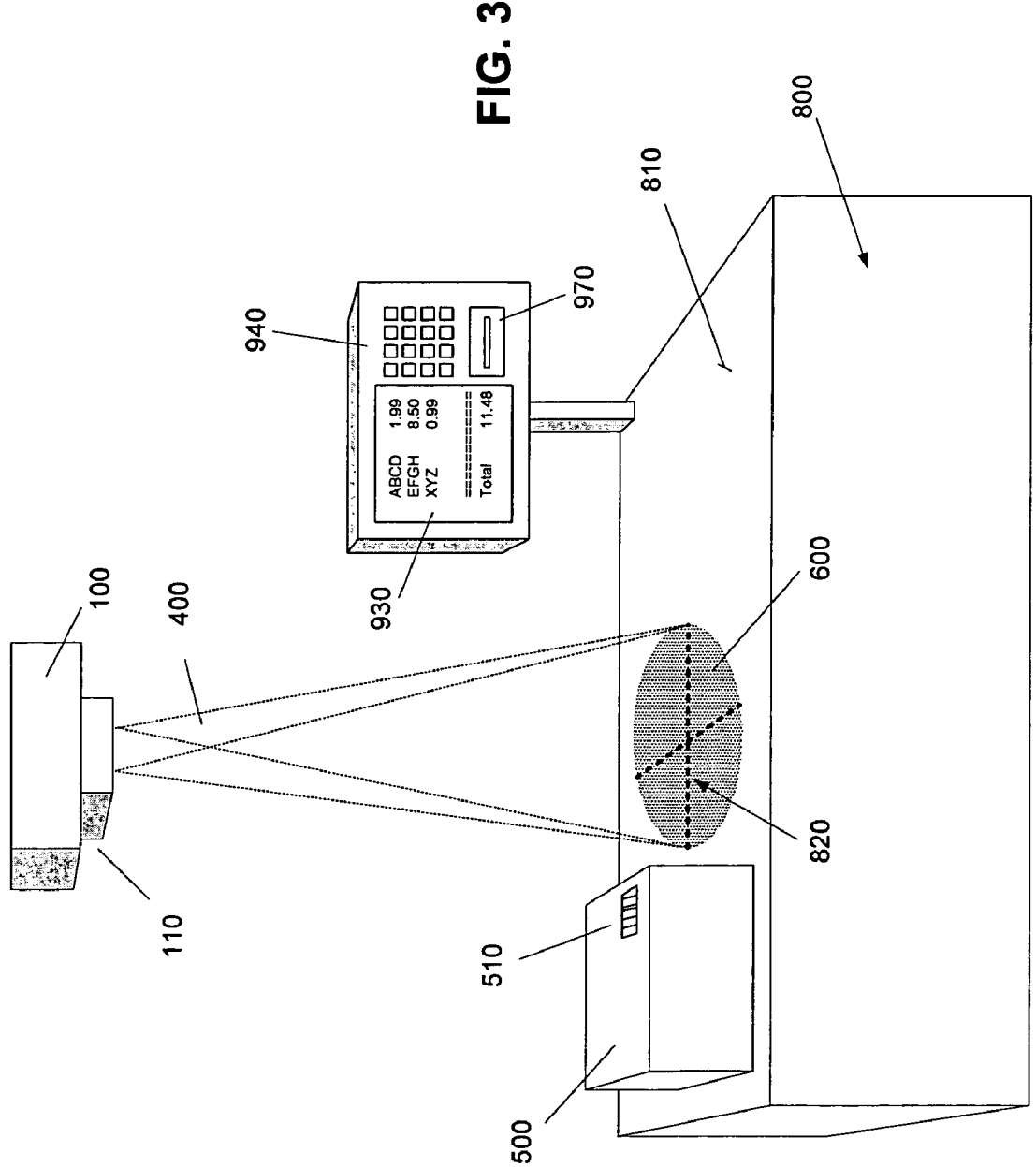
FIG. 3 is a diagram of a retail scanning system showing a scanning spot with an projected target thereon.

Preferably, the light source which illuminates the scanning area is configured to project a light spot 600 with a well defined boundary 610 onto a surface 810 of the checkout stand 800 (See FIG. 3). The light spot boundary indicates to a user where an item to be scanned should be placed. In a particular embodiment, the light spot is sized and shaped to cover an area generally coincident with the field of view of the image capturing system such that an image of everything illuminated by the spot will be captured and imaged. In a typical embodiment, the light spot will be round. However, other shaped light spots, such as squares, rectangles, etc., can also be provided.

Preferably, the light source 120 utilizes the same coaxial lens assembly 140 (schematically shown on FIG. 2A) as the imager 150 for focusing light beams. The utilization of various possible arrangements of LEDs and laser diodes as an illumination or lighting source for optical scanners are well known in the art and are described in more detail in U.S. Pat. No. 5,756,981, U.S. Pat. No. 5,828,050, and U.S. Pat. No. 4,652,750, the disclosure of which is hereby incorporated by reference. Similarly, various optical assemblies for focusing light onto the symbology and for focusing light reflected from the scanned symbology are described in detail in U.S. Pat. No. 5,756,981, and U.S. Pat. No. 5,010,241, which are also hereby incorporated by reference.

The imager 150 of the scanning station 100 may be a CCD-based detector, a CMOS-based camera or any other type of image detecting device that senses and captures light reflected off the sensed symbology 510, preferably by using the lens assembly 140 to focus the reflected light. CCD-based image detectors are well known in the art and are described in more detail in U.S. Pat. Nos. 5,786,582; 5,291,009; 5,349,172; 5,354,977, the disclosure of which is hereby incorporated by reference, while use of a CMOS-based camera imager is discussed in U.S. Pat. No. 5,585,616, the disclosure of which is also incorporated by reference. The imager 150, together with the lens assembly 140, are preferably capable of imaging bar codes placed within the spot of light 600 from four to sixteen feet, with a depth of field 700 of eighteen to thirty-six inches.

Once the imager 150 captures the image of the reflected symbology 510, it converts it to an electronic or digital image of the sensed symbology. Thereafter, the decoder 160 converts this electronic or digital image into a signal that is representative of said sensed symbology. This signal is then transmitted by the wireless transmitter 180 of a scanning station 100 to the wireless receiver 980 of a receiving station 900 for subsequent processing by the microprocessor 910, which utilizes the computer memory 920 to store and process information received by the receiving station. The transmission may be accomplished utilizing either radio frequency (RF) or infrared signal (IR) (or multiple signals). Both, RF and IR transmitters and receivers are well known in the art. (See U.S. Pat. Nos. 5,359,448, and 4,622,681, the disclosure of which is hereby incorporated by reference.)

The decoding of a digital (or electronic) image of the sensed symbology, thereby converting it to a signal that is representative of said sensed symbology, is preferably performed at the scanning station 100 by the decoder 160. Alternatively, the transmitter 180 may transmit the digital (or electronic) image of the sensed symbology as an IR or RF signal to the wireless receiver 980 of the receiving station 900, where it is converted to a signal that is representative of said sensed symbology by the decoder 960 (not shown).

In order to permit processing of sales transactions at the receiving station 900, the receiving station 900 is preferably equipped with a display screen 930, an input apparatus 940 (for example, a keyboard), a cash register 950 and a receipt printer 970.

Electric current is supplied to the scanning and receiving stations via power inputs 199 and 999 (schematically shown in FIGS. 2A and 2B), coming from an AC power supply, battery, rechargeable battery or any other source of an electric current.

With reference to FIGS. 2A and 3, a second light source and associated projection assembly 122 is provided. The projection assembly will typically be separate from lens assembly 140 which may be used by the illuminating light source 120. However, depending on the configuration, sharing of optical components is possible. The second light source 122 is configured to project a targeting image 820 onto the surface 810 of the checkout station 800. The target image 820 is designed to indicate to a user where an object should be placed for scanning purposes.

The target from the second light source can be better defined than the spot 600 because a generally uniform illumination is not required. Advantageously, the use of a target separate from the illumination light source 120 permits a wider variety of scanning devices to be used and, in particular, allows the use of non- or poorly visible light illumination, such as infrared illumination, since the target pattern shows the placement separately from the illumination spot.

Various target images can be utilized and additional images, such as text or graphic based instructions, can also be projected. For example, FIG. 3 shows a top view of surface 810 with a cross or X-target 820, projected text instructions 822, and images of arrows 824 to illustrate the direction items should moved through the target area.

Any suitable image projection system can be used to produce the target image. Because items can be scanned throughout the depth of field of the scanning assembly, targeting light source and assembly 122 should be placed close enough to the illuminating light source 120 to reduce parallax throughout the scanning field to acceptable levels. Preferably the targeting light source is adjacent to the illuminating light source.

In a preferred embodiment, different projection patterns are provided for use during different phases of checkout. The target and instructions shown in FIG. 4A are suitable for use during scanning of items for purchase. In a particular implementation, scanning system is configured to capture an image of a customer's credit or debit card after all items for purchase have been scanned.

Upon receiving a signal by a customer that all items have been scanned, the projection pattern can be changed, such as to the pattern shown in FIG. 4B which instructs the user to place their card in a specified location. Once the image of a card has been captured, it can be processed to extract the customer's name, account numbers, card expiration date, and other relevant data. This data can then be sent to a payment system (not shown) for processing. Advantageously, this configuration eliminates the need to provide a separate magnetic card scanner at the checkout station.

Alternatively, the system can be configured to scan images captured by the scanning system for the presence of a credit or debit card in the image. The presence of a card in the scanning region can be used as a signal that the customer has scanned all items and to enter the payment phase.

If entry of a PIN number is required, the number can be typed by the customer on the keyboard 940. If a signature is required, a signature slip can be printed and delivered to the customer to sign. Alternatively, the customer can sign using an electronic signature capturing device. Such devices are known to those of skill in the art. The signature verification can be done by a store clerk or other personnel.

In a further embodiment, the customer can be instructed to place their credit card signature-side up in the scanning target so that the signature can be imaged. The imaged signature can then be compared with an image of the signature on the signature slip or an electronically captured signature and an alert or assistance-required signal produced if the signatures are not sufficiently similar.

Figure 4C:
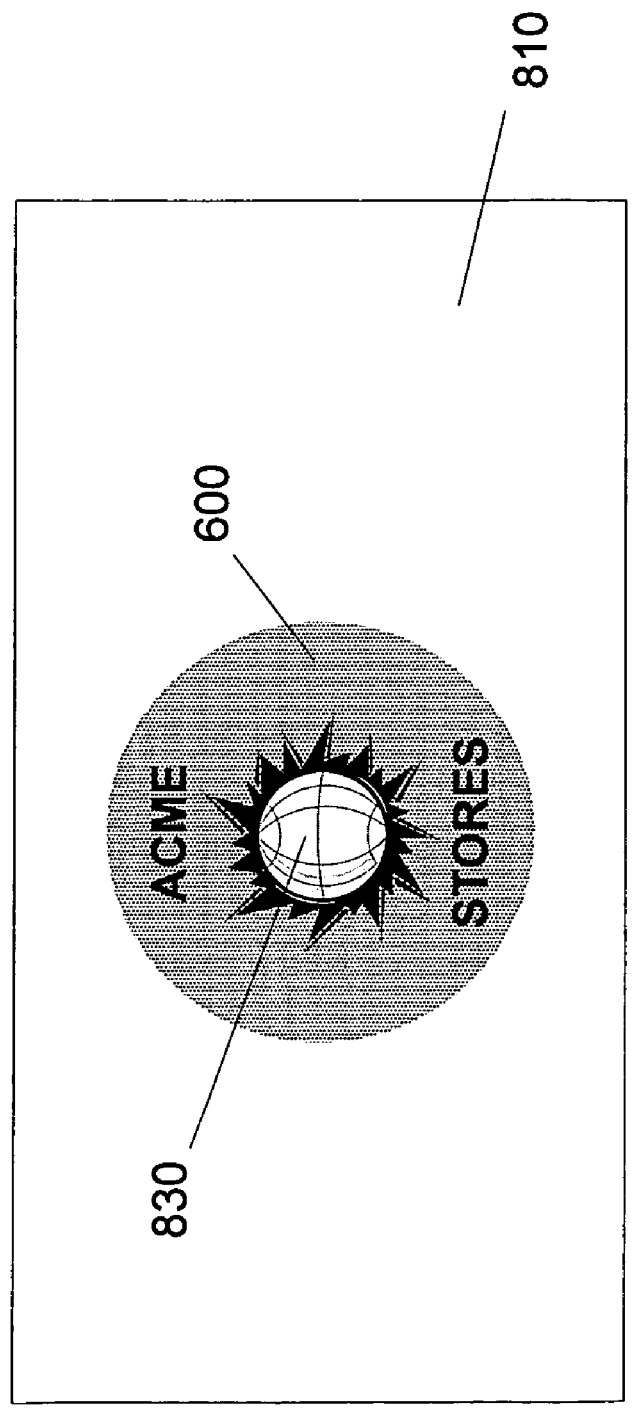

Other projection patterns can also be provided for use at different phases of the checkout process, such as including logos and advertisements. FIG. 4C shows an example of a store logo 830 projected over the illumination spot and which can be shown during idle periods or after payment has been received.

Various image projection assemblies known to those of skill in the art can be used to form the second light source and assembly 122. In one embodiment, the second light source comprises a light source which projects an image contained in a slide. Various projection images can be provided by moving different slides into the optical path, by using multiple lights, each of which illuminates a different image, or through other means.

In another embodiment, the light is provided by a laser, such as a laser diode, and the image formed by passing the light through a diffractive optical element (DOE). Separate projection patterns can be provided by using multiple DOEs. Alternatively, the image can be formed by using a laser projection system which "paints" the image by using a series of computer controlled mirrors. This variation, while more complex than static DOEs, provides a great deal of flexibility since a wide variety of images and text can be programmed for display. A computer controlled video projection system can also be used.

One particular advantage of the use of lasers to produce the projection pattern is that the laser light is of a well defined frequency. This permits use of a suitable narrow-pass filter in the system to eliminate the projection pattern light from the light passed to the imager for capture and processing and thereby eliminate any interference which may be produced by a projected pattern superimposed over the item being scanned.

According to a further aspect of the invention, images captured during scanning of various items are placed stored in a database or image store for subsequent use. As used herein, placing or storing an image encompasses storing the entire image or storing a portion of the image, such as the portion containing the item which was scanned. The stored images comprise a record of the state of those items at the time of scanning and can be used for various purposes. In one implementation, the stored image data can be associated with a user-ID or receipt number. The user-ID can be from a personal ID card, a credit or debit card, or associated with the user via other means.

The images can be stored in compressed form and archived periodically, e.g., by dumping data to an optical disk, or written directly to the disk in the first place. Images can be deleted after a specified time period. The image-store function can be enabled by the setting of an appropriate flag in a product database used to associated item bar-codes with, e.g., a price, such that specific products to image can be specified. In a variation, images can be placed in the image store for all products of a particular type or exceeding a specified threshold price.

The stored images can recalled as needed for various purposes. For example, the images can be recalled when there is a customer dispute about the state of a purchased object to determine the state of the packaging when the product was purchased. For packaging which indicates a product serial number, the image can be used to determine whether the serial number of a subsequently returned product is the same as the one on the scanned package. The stored images can also be used for security and other purposes which will be appreciated by those of skill in the art.

Although the invention has been described with reference to the specific embodiments, it will be apparent to one skilled in the art that variations and modifications are contemplated within the spirit and scope of the invention. For example, while an initial embodiment of the invention has been disclosed for use in a wireless-data communication environment, the scanning stations can be connected to the receiving station using physical connections. Similarly, the term bar-coding has been used throughout. This term should be considered as encompassing one- and two-dimensional bar code symbols as well as other multidimensional optical coding symbologies. The drawings and description of the specific embodiments are made by way of example rather than to limit the scope of the invention, and it is intended to cover within the spirit and scope of the invention all such changes and modifications.

What is claimed is:

1. An optical scanning system in a retail environment for purchasing items, comprising:
   a checkout stand having a surface across which the items to be purchased are passed;
   a scanning station including a light source for projecting an incident beam of light generally perpendicular to the surface onto optical-code symbology on an item to be purchased, an optical assembly having an optical lens for focusing light reflected from the symbology, and a two-dimensional imager for sensing and capturing the focused light over a field of view to obtain an image of the symbology during a scanning mode of operation, the beam of light, when incident on the surface, producing an illumination spot sized and shaped to cover an area generally coincident with the field of view of the imager such that an image of substantially everything illuminated by the spot will be captured and imaged, the scanning station being further operative for displaying indicia on the surface to prompt a user where to place a payment card during a payment mode of operation, the illumination spot having a well-defined outer boundary in which the user places the item during the scanning mode, and the payment card during the payment mode; and
   a receiving station in data communication with the scanning station and associated with the checkout stand, the receiving station including a microprocessor and a memory.

2. The system of claim 1, further comprising a decoder for converting the symbology image into a signal that is representative of data encoded in the symbology.

3. The system of claim 2, wherein the decoder is in the scanning station, and wherein the scanning station is configured to send the signal from the scanning station to the receiving station.

4. The system of claim 3, wherein the scanning station further comprises a wireless transmitter, and wherein the receiving station comprises a wireless receiver.

5. The system of claim 3, wherein the receiving station further comprises a display screen for displaying information related to a received signal.

6. The system of claim 5, wherein the receiving station further comprises an input device and a receipt printer for processing transactions associated with the received signal.

7. The system of claim 1, wherein the receiving station further comprises a cash register.

8. The system of claim 1, further comprising an image database in which the image is stored.

9. The system of claim 1, wherein the system is configured to capture images of a plurality of the items during the scanning mode and to place at least some of the captured images in an image database.

10. An optical scanning station, comprising:
    a first light source for projecting an incident beam of light onto a surface across which items to be scanned are passed so as to illuminate coded symbology on the items;
    an optical assembly having an optical lens for focusing light reflected from the symbology;
    a two-dimensional imager for sensing and capturing the focused light to obtain an image of the symbology during a scanning mode of operation; and
    a second light source for projecting a plurality of patterns onto the surface for display at different times, including a human-readable instruction visible on the surface for prompting a user to place an item to be scanned within the incident beam of light during the scanning mode, and an aiming pattern having visible markings within the incident beam of light for assisting the user in positioning the item at a desired orientation within the incident beam of light during the scanning mode.

11. The station of claim 10, wherein another pattern projected by the second light source displays indicia on the surface to prompt the user to place a payment card within the incident beam of light during a payment mode of operation.

12. The station of claim 10, further comprising a decoder for converting the symbology image into a signal that is representative of data encoded in the symbology.

13. The station of claim 12, and a transmitter in the scanning station for transmitting the signal to a receiving station;

and wherein the receiving station includes a receiver for receiving the sent signal, a microprocessor for processing the received signal, and a computer memory for storing the processed signal.

14. The station of claim 13, wherein the transmitter and the receiver are in wireless communication.

15. The station of claim 10, and means for mounting the scanning station on an overhead ceiling located above the surface over which the items are passed.

16. The station of claim 10, wherein the imager is one of a CCD-based and a CMOS-based camera.

17. The station of claim 10, wherein the first light source comprises one of a laser diode, an incandescent lamp, and a light emitting diode.

18. In a bar code scanning system for use in scanning bar coded symbology on items for purchase in a retail environment including a scanning station, a checkout stand having a surface across which the items are passed by an operator, and a receiving station in communication with the scanning station, the scanning station being mounted above the surface, the scanning station comprising:
    a first light source for projecting an incident beam of light onto the surface so as to illuminate coded symbology on the items passed through the incident light beam;
    an optical assembly having an optical lens for focusing light reflected from the symbology;
    a two-dimensional imager for sensing and capturing the focused light to obtain an image of the symbology during a scanning mode of operation;
    a decoder for converting the symbology image into a signal that is representative of data encoded in the symbology;
    a transmitter for transmitting the signal from the scanning station; and
    a second light source for projecting a plurality of visible patterns onto the surface at different times, including an aiming pattern comprising a target visible within the incident beam of light for indicating to a user where on the surface an item to be purchased should be placed during the scanning mode, and a human-readable pattern visible on the surface for prompting the user to place the item within the incident beam of light; and
    the receiving station comprising:
        a receiver for receiving the signal sent by the transmitter;
        a microprocessor for processing the received signal;
        a computer memory for storing the processed signal;
        a display screen for displaying information related to the signal; and
        an input device.

19. The system of claim 18, wherein the information related to the signal comprises a price of the item.

20. The system of claim 18, wherein the transmitter and the receiver are in wireless communication.

21. The system of claim 18, wherein another pattern projected by the second light source displays indicia on the surface to prompt the user to place a payment card within the incident beam of light during a payment mode of operation.

22. The system of claim 21, wherein the imager is configured to capture an image of the payment card placed within the incident beam of light.

23. The system of claim 18, wherein the scanning station is mounted on or at least partially within a ceiling above the surface.

24. The system of claim 18, wherein the imager is one of a CCD-based and a CMOS-based camera.

25. The system of claim 18, wherein the first light source comprises one of a laser diode, an incandescent lamp, and a light emitting diode.

26. The system of claim 18, wherein the second light source comprises a laser and a diffractive optical element.

27. The system of claim 18, wherein the incident beam of light produces a light spot having a generally uniform intensity across an area of the surface.

28. The system of claim 18, wherein the first light source emits a substantially non-visible beam of light.

29. A method of purchasing items in a retail environment, comprising the steps of:
    projecting an incident beam of light from a light source in a scanning station in a direction generally perpendicular to a surface of a checkout stand onto optical-code symbology on an item to be purchased;
    focusing light reflected from the symbology;
    sensing and capturing the focused light over a field of view to obtain an image of the symbology during a scanning mode of operation, the beam of light, when incident on the surface, producing an illumination spot sized and shaped to cover an area generally coincident with the field of view such that an image of substantially everything illuminated by the spot will be captured and imaged;
    converting the symbology image into a signal that is representative of data encoded in the symbology;
    transmitting the signal from the scanning station to a receiving station;
    receiving the transmitted signal at the receiving station;
    displaying information related to the captured signal on a display associated with the receiving station; and
    displaying indicia on the surface to prompt a user where to place a payment card during a payment mode of operation, the illumination spot having a well-defined outer boundary in which the user places the item during the scanning mode, and the payment card during the payment mode.

30. The method of claim 29, wherein the step of converting the symbology image into the signal that is representative of data encoded in the symbology is performed by a decoder at the scanning station.

31. The method of claim 29, further comprising a step of processing the received signal at the receiving station using a microprocessor, and a step of storing the processed signal.

32. The method of claim 29, wherein the displayed information comprises a price associated with the item.

33. The method of claim 29, further comprising a step of processing transactions associated with the received signal using an input device, a cash register and a receipt printer associated with the receiving station.

34. A method of processing transactions, comprising the steps of:
    illuminating a portion of a surface over which items to be transacted are passed by projecting an incident beam of light onto the surface;
    projecting a target pattern having markings visible within the incident beam of light, from a scanning station onto the surface during a scanning mode of operation for indicating to a user a target area on the surface where an item should be placed;
    focusing light reflected from symbology on the item placed by the user within the target area;
    sensing and capturing the focused light to obtain an image of the symbology;
    converting the symbology image into a signal that is representative of data encoded in the symbology;

transmitting the signal from the scanning station to a receiving station;

receiving the transmitted signal at the receiving station;

displaying information related to the captured signal on a display; and projecting a human-readable visible pattern onto the surface during a different mode of operation to prompt the user to complete a transaction for the item.

35. The method of claim 34, wherein the step of converting the symbology image into the signal representative of data encoded in the symbology is performed by a decoder at the scanning station.

36. The method of claim 34, wherein the displayed information comprises a price associated with the item.

37. The method of claim 34, further comprising a step of processing the transaction by using an input device, a cash register and a receipt printer associated with the receiving station.

38. The method of claim 34, wherein the human-readable pattern displays indicia on the surface to prompt the user to place a payment card within the illuminated portion of the surface during a payment mode of operation.

39. The method of claim 34, and further comprising the step of displaying a product advertisement during an idle mode of operation.

40. The method of claim 34, and further comprising the step of displaying a logo during an idle mode of operation.

* * * * *